(No Model.) 2 Sheets—Sheet 1.
J. CARSTEN.
REELING MACHINE.
No. 513,083. Patented Jan. 23, 1894.
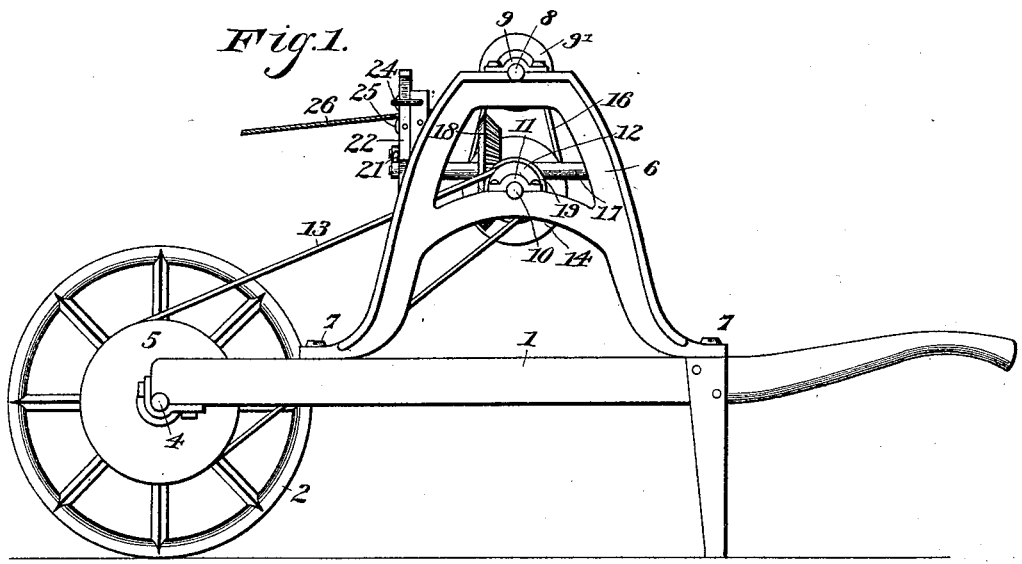
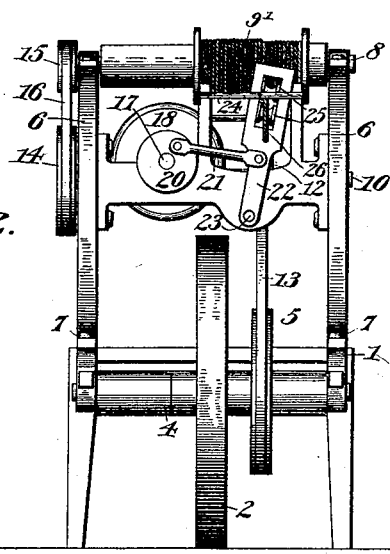
Witnesses:
Inventor,
John Carsten,
Attorneys.

(No Model.)

J. CARSTEN.
REELING MACHINE.

No. 513,083.

2 Sheets—Sheet 2.

Patented Jan. 23, 1894.

Witnesses:

Inventor,
John Carsten,
By Hopkins & Atkins
Attorneys

THE NATIONAL LITHOGRAPHING COMPANY,
WASHINGTON, D. C.

UNITED STATES PATENT OFFICE.

JOHN CARSTEN, OF LANHAM, KANSAS.

REELING-MACHINE.

SPECIFICATION forming part of Letters Patent No. 513,083, dated January 23, 1894.

Application filed February 9, 1893. Serial No. 461,608. (No model.)

*To all whom it may concern:*

Be it known that I, JOHN CARSTEN, of Lanham, in the county of Washington, State of Kansas, have invented certain new and useful Improvements in Reeling-Machines, of which the following is a specification, reference being had to the accompanying drawings.

The object of my invention is to produce an improved machine for reeling rope, wire, or the like, and preferably consists of the combination of an improved reeling machine with a wheel-barrow adapted to operate it.

Figure 3:
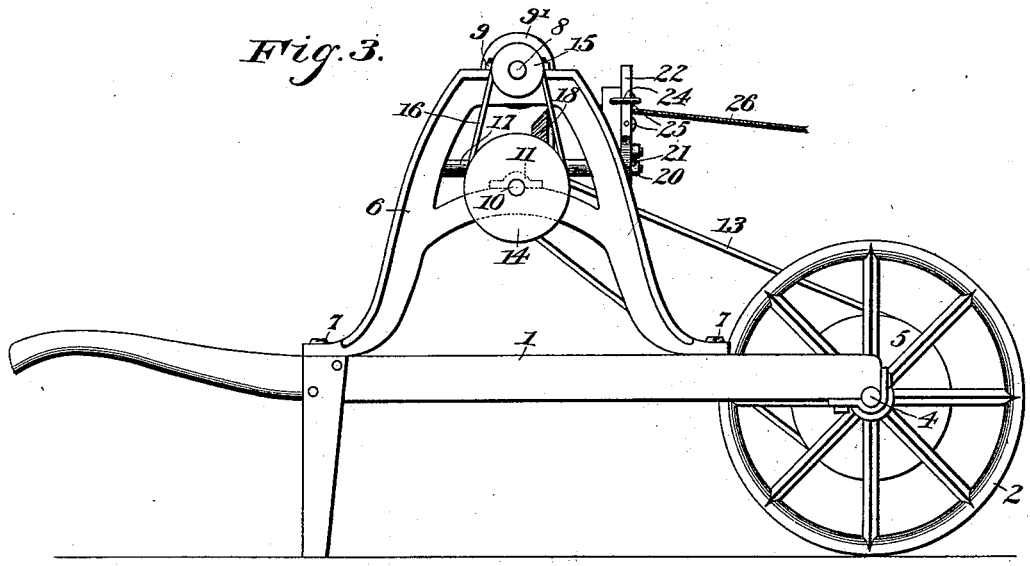
Figure 4:
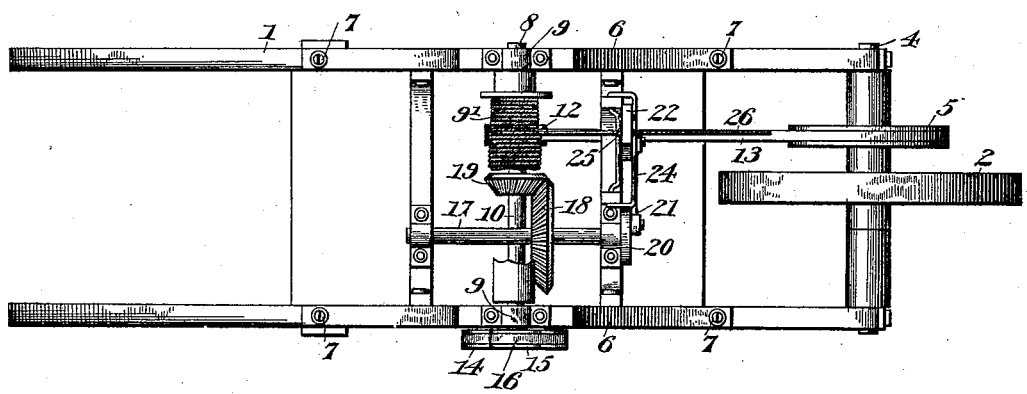

In the accompanying drawings: Figure 1 is a side elevation of my machine. Fig. 2 is a front elevation thereon. Fig. 3 is a view of the other side; and Fig. 4 a top plan view of the same.

Referring to the figures on the drawings: 1 indicates a suitable vehicle, as, for example, a wheel-barrow, having, in that instance, a single wheel 2, fixed to a shaft 4, to which is also fastened a belt pulley 5.

6 indicates a suitable frame firmly but detachably secured to the top of the vehicle, as by screws 7.

8 indicates a shaft carried in suitable bearings 9 upon the top of the frame and adapted to carry a reel or bobbin 9' removably.

10 indicates a second or driving shaft carried in suitable bearings 11 parallel to the shaft 8. The shaft 10 is provided with a pulley 12 which, by a belt 13, is driven from the pulley 5.

The shafts 8 and 10, respectively, carry upon their adjacent ends fixed belt pulleys 14 and 15, respectively. They are connected by a belt 16. It will appear, therefore, that the shaft 10 is driven by the rotation of the wheel 2 and that it, in turn, imparts rotation to the reel or bobbin, to wind or unwind the material upon it.

To insure the even winding of the material upon the bobbin I prefer to employ distributing mechanism, which preferably consists of a shaft 17 carried in suitable bearings at right angles to the shaft 10. The shaft 17 has a miter gear wheel 18 secured to it, which meshes with a corresponding gear 19 secured to the shaft 10. Upon the end of the shaft 17 is secured a wheel 20 which, by a pitman 21, imparts oscillatory movement to a distributing frame 22 pivoted, as indicated at 23, to the main frame. A cage 24 preferably surrounds the distributing frame guiding and limiting its movement. The distributing frame is provided with grooved rollers 25, through which the material to be wound, indicated at 26, is passed from the bobbin. When the vehicle is moved upon the wheel 2 it imparts rotation to the shaft 10 and thence to the bobbin, as above suggested. At the same time, the distributing mechanism is operated so that the distributing arm carries the material back and forth upon the bobbin and causes it to wind evenly thereon.

The respective sizes of the gears 18 and 19 should be adjusted so as to insure the proper relative movement of the parts.

While I have shown and described a particular form of embodiment of my invention, I do not wish to limit myself thereto, but reserve the right to vary and modify the construction and arrangement of parts at will, within the scope of my invention.

What I claim is—

1. The combination with a vehicle, wheel, and wheel shaft, of a detachable frame thereon supporting a driving shaft, bobbin shaft and distributing frame operatively connected, and means for operatively connecting the wheel shaft of the vehicle with the driving shaft upon the frame, substantially as and for the purpose specified.

2. The combination with a vehicle wheel and wheel shaft, of a driving shaft operatively connected thereto, a bobbin shaft and a vertical oscillatory distributing frame operatively connected to the driving shaft, said bobbin shaft being adapted to be driven at a higher rate of speed than, and said oscillatory frame being adapted to oscillate once to several revolutions of said drive shaft, substantially as specified.

3. The combination with a vehicle wheel, wheel shaft, and frame and a driving shaft carried parallel with the wheel shaft in suitable bearings in the frame, and operatively connected with said wheel shaft, of a bobbin shaft carried above the drive shaft, parallel and operatively connected therewith, and adapted to be driven at a higher rate of speed than said drive shaft, a vertical oscillatory distributing frame pivoted to the frame, a shaft at right angles to the drive shaft geared at one end thereto, and operatively connected at its opposite end to the distributing frame and adapted to be rotated at a lower rate of speed than the drive shaft, substantially as and for the purpose specified.

4. The combination with a vehicle wheel and a detachable frame of a bobbin shaft operatively connected with the wheel, distributing mechanism also operatively connected therewith consisting of a vertical oscillatory frame pivoted to the frame at its lower end and provided with rollers, and a cage adapted to guide and limit the movement of the distributing frame, substantially as and for the purpose specified.

5. The combination with a vehicle, wheel and wheel shaft, of a driving shaft operatively connected therewith, a bobbin shaft carried above and driven by said driving shaft, a vertical oscillatory distributing frame and a shaft operatively connected with the distributing frame and driving shaft whereby the wire is wound upon the bobbin as it is slacked by the travel of the vehicle, substantially as and for the purpose specified.

In testimony of all which I have hereunto subscribed my name.

JOHN CARSTEN.

Witnesses:
WM. WIETERS,
HENRY DURSEE.